United States Patent
Günthner et al.

(10) Patent No.: US 9,394,203 B2
(45) Date of Patent: Jul. 19, 2016

(54) EXTRUDED MOLDED FUNCTIONAL BODY MADE OF HIGHLY THERMALLY CONDUCTIVE CERAMIC

(75) Inventors: Gerhard Günthner, Fuchsmühl (DE); Axel Schöler, Hof (DE); Alexander Dohn, Memmelsdorf (DE); Alfred Thimm, Wunsiedel (DE)

(73) Assignee: CeramTec GmbH, Plochingen (DE)

( * ) Notice: Subject to any disclaimer, the term of this patent is extended or adjusted under 35 U.S.C. 154(b) by 894 days.

(21) Appl. No.: 13/513,247

(22) PCT Filed: Dec. 2, 2010

(86) PCT No.: PCT/EP2010/068717
§ 371 (c)(1),
(2), (4) Date: Jun. 21, 2012

(87) PCT Pub. No.: WO2011/067325
PCT Pub. Date: Jun. 9, 2011

(65) Prior Publication Data
US 2012/0263896 A1 Oct. 18, 2012

(30) Foreign Application Priority Data
Dec. 2, 2009 (DE) .......................... 10 2009 047 412

(51) Int. Cl.
C04B 35/622 (2006.01)
C04B 35/581 (2006.01)
C04B 35/626 (2006.01)
C04B 35/628 (2006.01)
C04B 35/632 (2006.01)
C04B 35/634 (2006.01)
C04B 35/636 (2006.01)
F21V 29/00 (2015.01)

(52) U.S. Cl.
CPC ............. *C04B 35/581* (2013.01); *C04B 35/628* (2013.01); *C04B 35/6263* (2013.01); *C04B 35/62695* (2013.01); *C04B 35/632* (2013.01); *C04B 35/6365* (2013.01); *C04B 35/63416* (2013.01); *C04B 35/63424* (2013.01); *C04B 2235/3225* (2013.01); *C04B 2235/3865* (2013.01); *C04B 2235/5409* (2013.01); *C04B 2235/5436* (2013.01); *C04B 2235/6021* (2013.01); *C04B 2235/77* (2013.01); *C04B 2235/94* (2013.01); *C04B 2235/945* (2013.01); *C04B 2235/95* (2013.01); *C04B 2235/9607* (2013.01); *F21V 29/004* (2013.01); *Y10T 428/131* (2015.01)

(58) Field of Classification Search
CPC ............ C04B 35/581; C04B 35/62695; C04B 2235/3225; C04B 2235/6021
See application file for complete search history.

(56) References Cited

U.S. PATENT DOCUMENTS

| 4,833,108 | A | 5/1989 | Mizuno et al. |
| 5,182,239 | A | 1/1993 | Hirokawa et al. |
| 5,498,382 | A | 3/1996 | Seitz et al. |
| 2003/0098530 | A1* | 5/2003 | Inoguchi ....................... 264/630 |
| 2007/0243409 | A1 | 10/2007 | Terao et al. |
| 2009/0029128 | A1 | 1/2009 | Gotoh et al. |

FOREIGN PATENT DOCUMENTS

| DE | 41 19 695 A1 | 12/1991 |
| EP | 0 258 523 A2 | 3/1988 |
| EP | 0 287 841 A2 | 10/1988 |
| EP | 0 588 171 A1 | 3/1994 |
| EP | 1 900 488 A1 | 3/2008 |
| EP | 1 726 419 A1 | 11/2008 |
| JP | 2007-051062 | 3/2007 |

OTHER PUBLICATIONS

Groat, et al. "Aqueous Slip Casting of Stabilized AlN Powders", *Am. Ceramic Soc. Bulletin* vol. 73, No. 11 (1994), p. 75-78.

* cited by examiner

*Primary Examiner* — Erin Snelting
(74) *Attorney, Agent, or Firm* — Norton Rose Fulbright US LLP

(57) ABSTRACT

The invention relates to molded functional bodies made of highly thermally conductive materials, namely aluminum nitride, to a method for the production thereof by way of extrusion, and to the use thereof.

11 Claims, No Drawings

EXTRUDED MOLDED FUNCTIONAL BODY MADE OF HIGHLY THERMALLY CONDUCTIVE CERAMIC

This application is a §371 of PCT/EP2010/068717, filed on Dec. 2, 2010 and claims priority from DE 102009047412.9, filed on Dec. 2, 2009.

The subject matter of the present invention is molded functional bodies made of highly thermally conductive materials, a method for producing same, and use thereof.

Resistor cores having a high insulation resistance are made of cylindrical ceramic supports, for example, on the surface of which a layered coating having a defined resistance is sintered/tempered.

The ceramic is composed predominantly of an alumina-containing material having a low thermal conductivity (approximately 10-25 W/m*K).

Molded functional bodies made of highly thermally conductive material having a defined design, for example elongated cooling elements having internal tube(s) for liquid cooling with dimensions of 30*30*250 mm, are not yet commercially available. Using the known, inexpensive methods, it is difficult or even impossible to process the highly thermally conductive materials, which are suited for such purposes, to form the desired designs.

Aluminum nitride (AlN), for example, is particularly preferred as a highly thermally conductive material. A ceramic made of this material (AlN ceramic) would be particularly suited for high-performance use, for example for rapidly dissipating heat. The extrusion process, used for molded functional bodies having a defined design, has not been usable heretofore for aluminum nitride (AlN) due to the fact that extrusion compounds are usually conditioned with water. The sensitivity of aluminum nitride to hydrolysis prevents the use of this process, and thus far has made it impossible to produce molded functional bodies, made of aluminum nitride and having a defined design, on a large scale. Incomplete splitting of aluminum nitride into aluminum hydroxide and ammonia is observed in an aqueous medium.

One object of the present invention, therefore, is to provide an aluminum nitride that is suitable for the extrusion process. A further object of the present invention is to provide extruded molded functional bodies having a defined design and made of aluminum nitride.

Basically, aluminum nitride may be produced in two ways.

One approach for production of aluminum nitride is so-called direct nitridation. In this type of synthesis, powdered metallic aluminum or aluminum oxide is reacted with $N_2$ or $NH_3$ at temperatures of >900° C. to produce aluminum nitride (AlN):

$$2Al + N_2 \rightarrow 2AlN$$

$$Al_2O_3 + 2NH_3 \rightarrow 2AlN + 3H_2O$$

Alternatively, at temperatures of >1600° C., aluminum nitride powder may be prepared by reacting aluminum oxide, nitrogen or ammonia, and carbon in excess in a carbothermic reaction:

$$2Al_2O_3 + 9C + 4NH_3 \rightarrow 4AlN + 3CH_4 + 6CO$$

$$Al_2O_3 + 3C + N_2 \rightarrow 2AlN + 3CO$$

Unlike direct-nitrided aluminum nitride, carbothermically produced aluminum nitride has a lesser tendency toward hydrolysis.

The objects of the invention are achieved according to the invention by providing a specially conditioned aluminum nitride and using same in the extrusion process. According to the invention, it is provided to use a carbothermically produced aluminum nitride powder known per se, and an aluminum nitride-yttrium oxide granulate known per se, for example an aluminum nitride-yttrium oxide granulate prepared analogously to European Patent EP 0 258 523 B1, preferably a carbothermally produced aluminum nitride-yttrium oxide granulate. The aluminum nitride-yttrium oxide granulate is preferably provided with an organic coating, and has a sufficiently high yttrium oxide content for the intended purpose. Aluminum nitride-yttrium oxide granulate having an organic coating may be prepared analogously to European Patent EP 0 588 171 B1, for example.

The starting materials which are usable according to the invention are also commercially available.

Surprisingly, the types of aluminum nitride which are usable according to the invention may be obtained using water, at least one organic binder, and optionally dispersants and oils or waxes to form a chemically stable extrudable compound. From this compound, it is possible to produce molded functional bodies composed of aluminum nitride and having a defined design, for example small solid bodies, short cylindrical hollow bodies a few millimeters in size, as well as long circular or polygonal profiles having practically any desired dimensions, for example profiles having an external dimension of approximately 90 mm and a length of typically 100-400 mm.

According to the invention, it is provided to mix a carbothermally produced aluminum nitride powder and a carbothermally produced aluminum nitride-yttrium oxide granulate, which preferably is provided with an organic coating and has a sufficiently high yttrium oxide content. Hydrolysis is thus largely prevented, even at the beginning of the molded material production, so that very labor-intensive coating of AlN and $Y_2O_3$ is unnecessary.

The types of aluminum nitride provided according to the invention may be mixed in a ratio of 20:80 to 80:20, preferably in a ratio of 50:50, depending on the $Y_2O_3$ content in the granulate used. The total quantity of $Y_2O_3$ in the ceramic portion is preferably 2 to 5%. Additional $Y_2O_3$ may be added to the batch if necessary. The carbothermally produced aluminum nitride used usually has a specific surface of 1 to 10 $m^2/g$ and an average particle size $d_{50}$ of 0.5 to 5 μm, preferably 1.0 to 2.0 μm. The types of aluminum nitride provided according to the invention are suspended in water and intensively mixed, with addition of at least one binder and optionally dispersants and mold release oils. Polyvinyl alcohols and/or types of cellulose, for example Polyviol, Mowiol, and/or Tylose, in quantities of 2 to 12%, preferably 5 to 10%, particularly preferably 7 to 8%, relative to the overall mixture are suitable as binder. Completely pyrolyzable agents based on polyacrylate, for example, in quantities of 0.05 to 0.5%, preferably 0.1 to 0.3%, particularly preferably 0.12 to 0.2%, relative to the overall mixture are suitable as dispersant. Any oils which facilitate the sliding of the compound from the extruder are suitable as oils. These auxiliary substances may be used in quantities of 3 to 10%, preferably 5 to 8%, particularly preferably 6 to 7%, relative to the overall mixture. The water required for the suspension constitutes 0.5 to 12% of the overall mixture.

The intensively mixed compound is then pressed into the desired shape with the aid of an extruder, preferably over a period of 50 h, and subsequently sintered under conditions that are customary for aluminum nitride ceramics.

It follows from the above discussion that the teaching according to the invention relates to a method for producing a molded functional body made of aluminum nitride ceramic, wherein:

an aqueous mixture of a carbothermally produced aluminum nitride powder and an aluminum nitride-yttrium oxide granulate, at least one binder, and optionally a dispersant and/or an oil or wax is thoroughly mixed, this mixture is pressed in an extruder to form a green molded functional body (blank), and this blank is sintered under conditions that are customary for aluminum nitride ceramics.

In the method according to the invention, it is preferred that:

the aluminum nitride-yttrium oxide granulate used is carbothermally produced;
the aluminum nitride-yttrium oxide granulate is provided with an organic coating;
the carbothermally produced aluminum nitride powder and the aluminum nitride-yttrium oxide granulate are mixed in a ratio of 20:80 to 80:20, preferably in a ratio of 50:50;
the total quantity of $Y_2O_3$ in the ceramic portion is preferably 2 to 5%;
the carbothermally produced aluminum nitride used has a specific surface of 1 to 10 $m^2/g$ and an average particle size $d_{50}$ of 0.5 to 5 μm, preferably 1.0 to 2.0 μm;
the binder is selected from polyvinyl alcohols and/or types of cellulose, for example Polyviol, Mowiol, and/or Tylose, in quantities of 2 to 12%, preferably 5 to 10%, particularly preferably 7 to 8%, relative to the overall mixture;
completely pyrolyzable agents based on polyacrylate, for example, in quantities of 0.05 to 0.5%, preferably 0.1 to 0.3%, particularly preferably 0.12 to 0.2%, relative to the overall mixture are used as dispersant;
oils are used which facilitate the sliding of the compound from the extruder, and are used in quantities of 3 to 10%, preferably 5 to 8%, particularly preferably 6 to 7%, relative to the overall mixture; and
the water required for the suspension constitutes 0.5 to 12% of the overall mixture.

The teaching according to the invention further relates to molded functional bodies made of aluminum nitride ceramic, producible by the method according to the invention, and to the use of the molded functional bodies as supports for light-emitting diodes, as resistance tubes, for constructing cooling elements for light-emitting diodes, or as coolers, in particular as liquid coolers.

The following examples are intended to explain the invention in greater detail without limiting same.

EXAMPLE 1

According to the Invention

50% carbothermally produced AlN powder and 50% AlN granulate made of carbothermally produced AlN and 4.8% $Y_2O_3$ were mixed. 6.0% oil, 0.12% dispersant, 1.3% water, and 7.6% organic binder were then added thereto and intensively mixed. This batch was extruded to form the following molded functional bodies made of aluminum nitride, having a defined design.

1.1 Blanks having a cross section of 30*30 mm and a circular recess 12 mm wide were extruded, cut into individual pieces 300 mm [long], dried, and sintered under nitrogen in a graphite furnace at 1800° C. The sintered body had a density of 3.29 g/cm³ and a thermal conductivity of 180 W/m*K. The sintered body was ground on at least one side, and a printed conductor layout for contacting an LED was metal-plated with gold paste. Such molded functional bodies are used, for example, as supports for light-emitting diodes.

1.2 Circular blanks having a cross section of 3 mm and a recess 1.5 mm wide were extruded, cut into individual pieces 10 mm long, dried, and sintered under nitrogen in a graphite furnace at 1800° C. Such molded functional bodies are used, for example, as resistance tubes.

1.3 Blanks in the form of cooling elements having fins (E-shaped) were extruded in dimensions of 40*40 mm, cut to a length of 60 mm, dried, and sintered as above. The flat side was leveled by grinding. Such molded functional bodies are used, for example, for constructing cooling elements for light-emitting diodes.

1.4 A base body made of the AlN batch prepared according to the invention, having the design of a pan flute or a small organ having tubes of equal length, was extruded. This base body was dried, and sintered under nitrogen in a graphite furnace at 1800° C. When appropriate devices are provided at the ends of the tubes, this base body may be used, for example, as a cooler, in particular as a liquid cooler.

EXAMPLE 2

Not According to the Invention

100% directly nitrided AlN powder, $d_{50}$=2.1 μm, was combined with 6.0% oil, 0.12% dispersant, 1.3% water, and 7.6% organic binder and intensively mixed. This batch was extruded.

The batch was hardened, and had a strong ammonia odor. Pressing in the extruder machine was not possible, since the extruder machine became plugged after a few millimeters were pressed out.

The invention claimed is:

1. A method for producing a molded functional body made of aluminum nitride ceramic comprising the steps of:
    mixing an aqueous mixture of a carbothermally produced aluminum nitride powder and an aluminum nitride-yttrium oxide granulate and at least one binder;
    pressing the mixture in an extruder to form a green molded functional body; and
    sintering the green molded functional body to yield the molded functional body comprising the aluminum nitride ceramic,
    wherein the carbothermally produced aluminum nitride powder and the aluminum nitride-yttrium oxide granulate are mixed in a ratio of 20:80 to 80:20.

2. A method according to claim 1, wherein the aluminum nitride-yttrium oxide granulate is carbothermally produced.

3. A method according to claim 2, wherein the carbothermally produced aluminum nitride powder and the aluminum nitride-yttrium oxide granulate are mixed in a ratio of 20:80.

4. A method according to claim 1, wherein the aluminum nitride-yttrium oxide granulate has an organic coating.

5. A method according to claim 1, wherein the total quantity of the yttrium oxide in the aluminum nitride ceramic is from 2 to 5%.

6. A method according to claim 1, wherein the carbothermally produced aluminum nitride used has a specific surface of 1 to 10 $m^2/g$ and an average particle size $d_{50}$ of 0.5 to 5 μm.

7. A method according to claim 1, wherein the binder is selected from the group consisting of a polyvinyl alcohol and a cellulose.

8. A method according to claim 1, further comprising adding a member selected from the group consisting of a dispersant, an oil and a waxy pyrolyzable agent.

9. A method according to claim 8, wherein the waxy pyrolyzable agent is based on polyacrylate.

10. A method according to claim 8, wherein the oil is added in an amount of 3 to 10%, relative to the overall mixture.

11. A method according to claim 1, wherein the water constitutes 0.5 to 12% of the overall mixture.

* * * * *